Feb. 23, 1943.  G. C. WEISS  2,312,293

STRUCTURAL ELEMENT

Filed May 9, 1939

George C. Weiss,
INVENTOR.

BY Raymond West Blakeslee,
ATTORNEY.

Patented Feb. 23, 1943

2,312,293

UNITED STATES PATENT OFFICE 2,312,293

STRUCTURAL ELEMENT

George C. Weiss, Venice, Calif.

Application May 9, 1939, Serial No. 272,627

5 Claims. (Cl. 72—71)

This invention relates to structural elements, and more particularly to reinforced plastic structural elements; and it has for objects to provide improved elements of this character which will be superior in point of relative inexpensiveness and simplicity of organization conjointly considered with inherent strength and resistance to imposed stresses, durability, length of effective service, adaptability to variation in conditions of environment and temperature particularly, and freedom from buckling or other distortion, and which will be generally superior in serviceability in a wide range of service and use. The field of such service and use is very wide and includes almost unlimited number of practices in which the above and other attendant qualities and features are desiderata.

With the above and other objects in view, the invention consists in the novel and useful provision, formation, combination, association and interrelation of parts, members and features, all as hereinafter described, shown in the drawing and finally pointed out in claims.

In the drawing.

Corresponding parts in the several figures are designated by the same reference characters.

Figure 1:
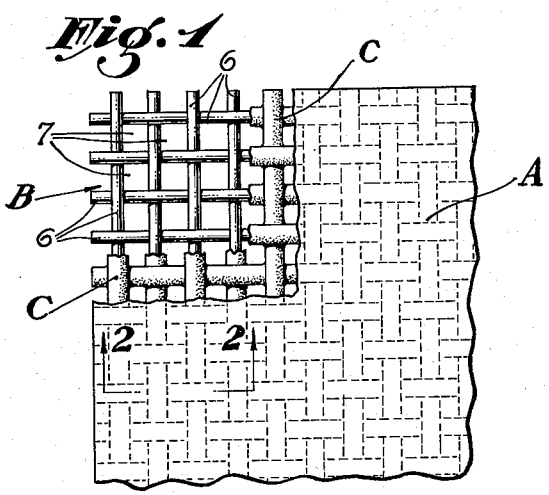
Fig. 1 is a fragmentary plan view, partly broken away for clearness of detail showing, of a structural element constructed and organized in accordance with the invention.

Referring with particularity to the drawing, I have shown at A plastic material within which is contained or embedded reinforcement material B; and C designates interposed material affecting the interrelation between the plastic and reinforcement materials. Taken together, they comprise the improved structural element, which may be used for a wide range of purposes, in building structures, in vehicle body and furniture body structures, and for any purpose utilizing the characteristics of the invention as disclosed. Ordinarily, the reinforcement material and plastic material will have different coefficients of expansion and contraction; and this tends to create stresses within the element, or an inherent unbalance of resultant forces, when the element is subjected to influences that render these variations in coefficients operative, such as subjection to changing temperature. The interposed material serves as an accommodating and compensating medium, absorbing these stresses or forces and thus restoring a normal balance of forces affecting the plastic and reinforcement materials. Preferably, the interposed material is yielding or elastic or resilient in nature, rubber being found particularly useful and satisfactory. The reinforcement material is preferably metallic. Such interposed material is applied to the reinforcement material as a coating or sheath, so that direct contact between plastic and reinforcement material is prevented, and the interposed material affects the adjustments mentioned. The plastic material may be mineral, such as cement, or vegetable, or both, or any suitable composition. It will be apparent, however, that my invention is confined to reinforced structures wherein the plastic and the reinforcing material have different coefficients of expansion and contraction, and in each instance the essential characteristic of the interposed material is a greater elasticity or resilience than the plastic or the reinforcing material. It will be understood that the nature of the bond between the plastic and the interposed material may be either chemical or mechanical.

Figure 2:
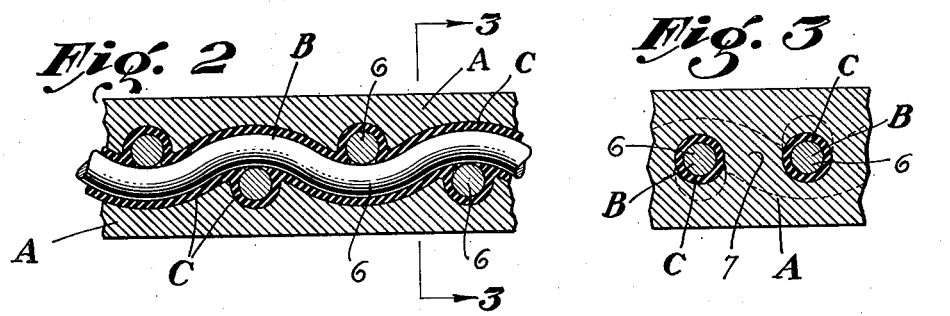
Fig. 2 is an enlarged, detail sectional view of the same, taken upon the line 2—2, Fig. 1, and looking in the direction of the appended arrows.
Figure 3:
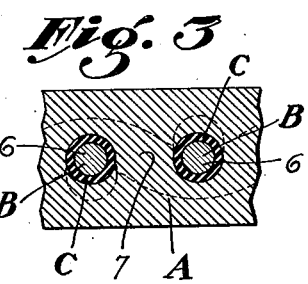
Fig. 3 is a detail sectional view taken upon the line 3—3, Fig. 2, and looking in the direction of the appended arrows.
Figure 4:
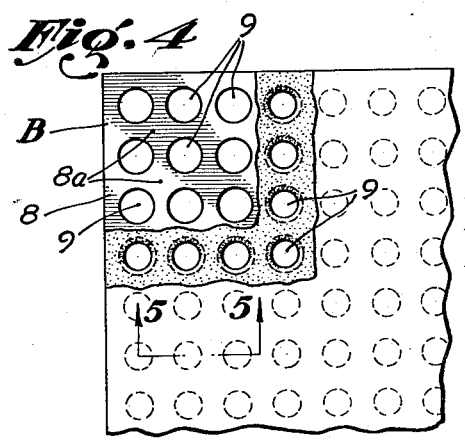
Fig. 4 is a view similar to Fig. 1 of a modified form of construction.
Figure 5:
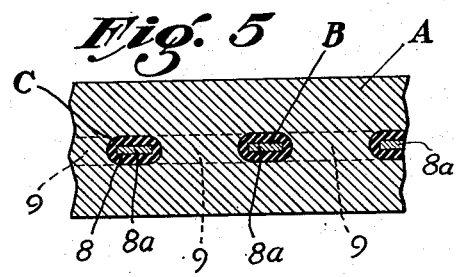
Fig. 5 is an enlarged detail sectional view, taken upon the line 5—5, Fig. 4, and looking in the direction of the appended arrows.

In Figs. 1, 2 and 3, the reinforcement material is shown as consisting of interwoven spaced strands 6, producing an open mesh structure with spaces 7 between the strands, and the latter are completely coated with rubber or other suitable material C. The plastic material A is then massed over about and through the foraminous or open-work material B so coated, as clearly shown in Figs. 2 and 3. In Figs. 4 and 5 the material B is shown as consisting of a perforated plate 8, the perforations 9 being so spaced apart, in any desired pattern, as to provide integuments 8a preferably of substantial dimensions superficially. These are completely coated with rubber or other material C. The plastic material A is then similarly massed over, about and through the perforated plate A so coated, as clearly shown in Fig. 5.

It will be noted that the sheathing or coating C completely invades the open spaces in the material B of both forms and constitutes a medium of separation and accommodation at all points between such material and the plastic material A, absorbing all stresses and forces set up in the materials A and B and which otherwise would tend to distort, buckle, weaken, crack or impair the strength and durability of the element.

It is obvious that many variations and changes and modifications and substitutions may be made, in practicing the invention and adapting it to varying conditions of use and service, without departing from the spirit thereof.

Having thus disclosed my invention, I claim and desire to secure by Letters Patent:

1. As an article of manufacture, a metallic reinforcing grid comprising pairs of members arranged transversely to one another and having openings therein, an elastic covering for the exposed surfaces of the grid, a body of hardened plastic of less elasticity than said covering enveloping said grid and having portions extending through the openings thereof and bonding together the portions of said plastic at opposite sides of said grid, said elastic covering compensating for expansion and contraction between said plastic and said metallic grid and forming a cushion between said plastic and the grid to minimize any tendency of the plastic to fracture upon the application of stress thereto.

2. As an article of manufacture, an interior foraminous reinforcing core, a rubber coating encasing the exposed surfaces of said foraminous core, and a hardened plastic of less elasticity than said coating and having a coefficient of expansion and contraction different from that of the core, said plastic enveloping said core and including portions extending through the openings thereof and bonding together the portions of said plastic at opposite sides of the core, said coating affording a resilient cushion between said core and said plastic to partially absorb pressure on the plastic adjacent said core and thereby minimize any tendency of the plastic to split upon an increase of pressure of either the core or the plastic against the other thereof in any direction.

3. In an article of manufacture, a hardened plastic body, a reinforcing member embedded in and having a coefficient of expansion and contraction different from that of said plastic body, a covering for said member composed of a material more resilient than said plastic body, adapted to resiliently transmit pressure of said body under stress applied thereto in a direction forming a right angle with the member, to said member, and a second reinforcing member in said body connected to and arranged transverse to said first member and having a coefficient of expansion and contraction different from that of said plastic body, a covering for said last-named member composed of a material more flexible than said plastic body to transmit pressure of said body under stress applied thereto in a direction forming a right angle with said second member, to said last-named member.

4. In an article of manufacture, a hardened plastic body, a pair of reinforcing members embedded in and having a coefficient of expansion and contraction different from that of said plastic body, said members being arranged transversely to one another, a covering for each of said members to prevent a bond between said members and said plastic body whereby the members may move relative to the plastic, said covering being composed of a resilient material to cushion the resistance to said movement of the reinforcing members arranged transverse to the line of relative movement between said members and the plastic body.

5. In an article of manufacture, a hardened plastic body, a reinforcing member embedded in and having a coefficient of expansion and contraction different from that of said plastic body, a covering for said reinforcing member composed of a deformable material to permit movement of said plastic body and member relative to one another, and separate means embedded in said plastic body to resiliently resist and limit the extent of said relative movement between said plastic and the reinforcing member.

GEORGE C. WEISS.